(12) United States Patent
Okamoto et al.

(10) Patent No.: US 10,532,702 B2
(45) Date of Patent: Jan. 14, 2020

(54) CLIP MOUNTING SEAT

(71) Applicant: TOYOTA BOSHOKU KABUSHIKI KAISHA, Aichi-ken (JP)

(72) Inventors: Kenji Okamoto, Aichi-ken (JP); Junpei Kai, Aichi-ken (JP); Misao Suzuki, Gifu-ken (JP)

(73) Assignee: TOYOTO BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/139,442

(22) Filed: Sep. 24, 2018

(65) Prior Publication Data
US 2019/0092251 A1    Mar. 28, 2019

(30) Foreign Application Priority Data
Sep. 27, 2017   (JP) .................................. 2017-186432

(51) Int. Cl.
*F16B 5/06*        (2006.01)
*B60R 13/02*       (2006.01)
(52) U.S. Cl.
CPC ...... *B60R 13/0206* (2013.01); *B60R 13/0243* (2013.01); *B60R 2013/0293* (2013.01)

(58) Field of Classification Search
CPC ............... F16B 5/0657; B60R 13/0206; B60R 13/0243; B60R 2013/0293
See application file for complete search history.

(56) References Cited

FOREIGN PATENT DOCUMENTS

| EP | 2833004 B1 * | 8/2016 | ............ F16B 5/0657 |
|----|---|---|---|
| JP | 2009-299850 | 12/2009 | |

* cited by examiner

*Primary Examiner* — Jack W Lavinder
(74) *Attorney, Agent, or Firm* — Greenblum & Bernstein, P.L.C.

(57) ABSTRACT

A clip mounting seat includes a mounting base having an outer edge, a mounting hole in which the clip is mounted, and a mounting base-side insertion opening at a part of a hole edge of the mounting hole and through which the clip is inserted to the mounting hole, a wall extending downward from the outer edge and including an insertion-side wall having a wall-side insertion hole that is communicated with the mounting base-side insertion opening, and a guide member included in the insertion-side wall and extending along an extending direction of the insertion-side wall and being adjacent to the wall-side insertion hole and opposite the mounting base-side insertion opening with respect to an insertion direction of the clip, the guide member configured to guide the clip in the insertion direction and having a width that is greater than an opening width of the mounting base-side insertion opening.

11 Claims, 6 Drawing Sheets

CLIP MOUNTING SEAT

CROSS REFERENCE TO RELATED APPLICATION

This application claims priority from Japanese Patent Application No. 2017-186432 filed on Sep. 27, 2017. The entire contents of the priority application are incorporated herein by reference.

TECHNICAL FIELD

The present disclosure relates to a clip mounting seat.

BACKGROUND

A clip mounting seat in which a clip is mounted has been known. Such a clip mounting seat includes a mounting seat body in which the clip is mounted and the mounting seat body has a clip stopper hole in which the clip is inserted and stays. An insertion hole is formed continuously from the clip stopper hole and an insertion base portion of the clip is inserted through the insertion hole toward the clip insertion hole. The clip mounting seat includes a stopper piece near the insertion hole, and the clip that is inserted in the clip stopper hole is less likely to be moved out of the clip stopper hole with the stopper piece.

In the above configuration, the stopper piece extends from an upper end of a base included in the clip mounting seat toward the insertion hole. When the clip is inserted into the stopper hole through the insertion hole, the clip presses the stopper piece downwardly and the stopper piece is elastically deformed such that the clip is inserted into the clip stopper hole. However, in the above configuration, the stopper piece has a narrow elongated shape and is very small with respect to an area of a clip seat body. With such a configuration, when the stopper piece is pressed with the clip, a contact area of the clip seat body and the stopper piece is small. Therefore, the clip may be unstable with respect to the stopper piece and it is difficult to control an insertion force or an insertion direction when the clip presses the stopper piece. Accordingly, the clip may not be inserted straight in the insertion hole but may be tilted with respect to the mounting seat body. If the clip may be inserted through the insertion hole while being tilted with respect to the mounting seat body and mounted in the clip stopper hole while being tilted, such a clip may be easily detached from the clip seat body.

SUMMARY

An objective of the present technology is to provide a clip mounting seat where a clip can be mounted stably with a correct posture and from which the mounted clip is less likely to be detached.

According to the present technology, a clip mounting seat in which a clip is mounted includes a mounting base having an outer edge, a mounting hole in which the clip is mounted, and a mounting base-side insertion opening that is included at a part of a hole edge of the mounting hole and through which the clip is inserted to the mounting hole, a wall extending downward from the outer edge of the mounting base and including an insertion-side wall having a wall-side insertion hole that is communicated with the mounting base-side insertion opening, and a guide member included in the insertion-side wall and extending along an extending direction of the insertion-side wall, the guide member being adjacent to the wall-side insertion hole and opposite the mounting base-side insertion opening with respect to an insertion direction in which the clip is inserted, the guide member having a width that is greater than an opening width of the mounting base-side insertion opening and being configured to guide the clip in the insertion direction.

DETAILED DESCRIPTION

Figure 1:
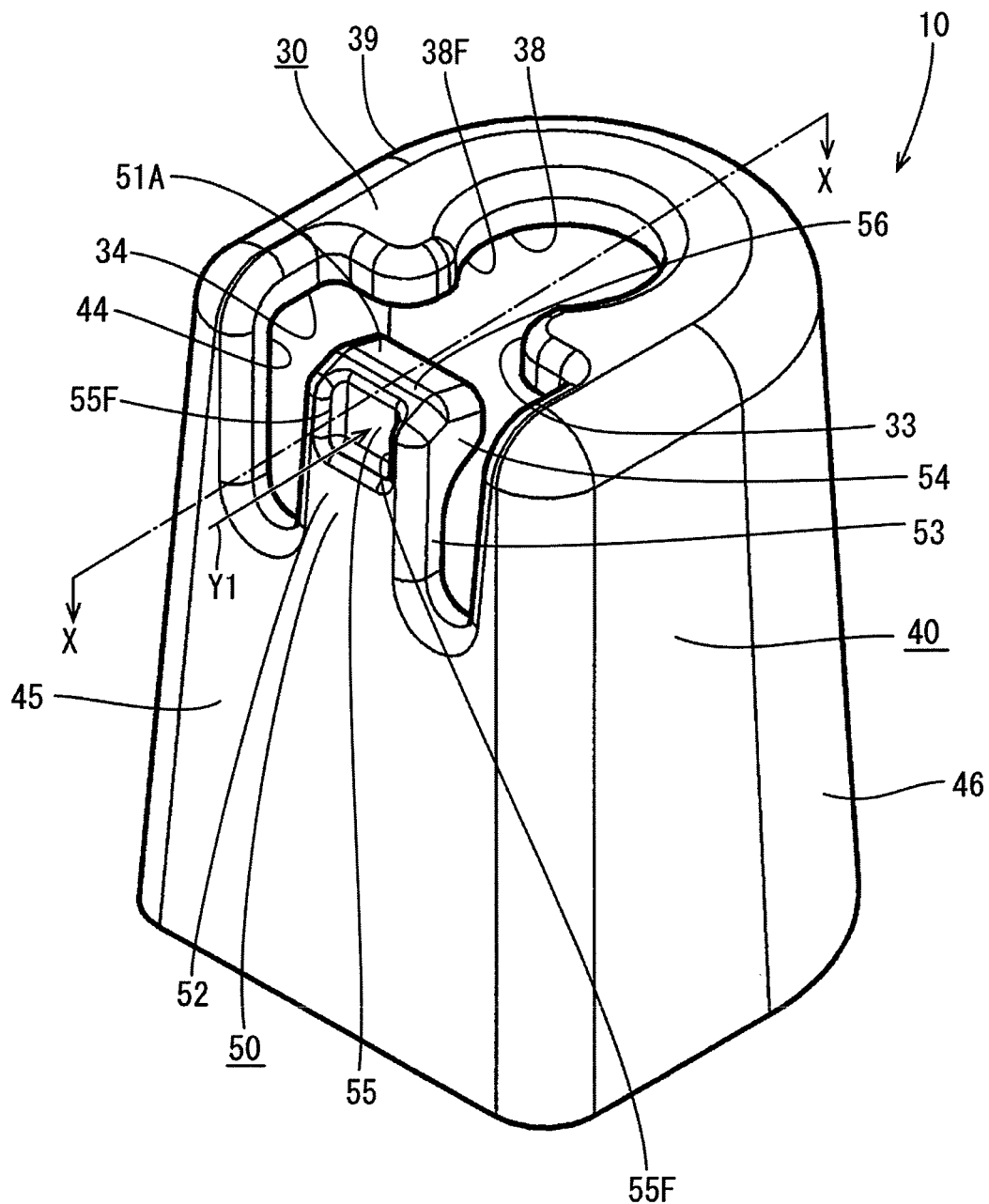
FIG. 1 is a perspective view of a clip mounting seat according to one embodiment of the present technology.

One embodiment of the present technology will be described with reference to FIGS. 1 to 6. In this embodiment section, a clip mounting seat in which a clip is mounted will be described as an example and especially the clip mounting seat including the clip that is used for mounting a vehicular door trim of a vehicle on a vehicular door inner panel will be described. In the following description, a vertical direction represents an up-down direction on the drawing sheets.

Clip mounting seats 10 are included on a vehicular exterior surface of a trim board (not illustrated) included in a vehicular door trim. The trim board and the clip mounting seats 10 are integrally molded with injection molding while using synthetic resin such as polypropylene. The trim board is mounted on a vehicular door inner panel P (see FIG. 6) with a clip 80 that is mounted in the clip mounting seat 10.

As illustrated in FIG. 1 the clip mounting seat 10 includes a mounting base 30, a wall 40 extending downward from an outer edge 39 of the mounting base 30. The mounting base 30 includes a mounting hole 38 and a mounting base-side insertion opening 33. The mounting hole 38 has the mounting base-side insertion opening 33 at a part of a hole edge 38F of the mounting hole 38. The clip 80 is inserted through the mounting base-side insertion opening 33 and mounted in the mounting hole 38. The mounting base 30 further includes an insertion hole 34 that is communicated with the mounting hole 38 through the mounting base-side insertion opening 33.

As illustrated in FIG. 1, the wall 40 has a tubular shape as a whole and includes an insertion-side wall 45 that is substantially a flat wall, and a curved wall 46 that is curved along an outer edge 39 of the mounting base 30. The insertion-side wall 45 has wall-side insertion holes 44 that are communicated with the mounting base-side insertion opening 33 through the insertion hole 34. The insertion-side wall 45 includes a guide member 50 at an upper middle portion thereof with respect to a width dimension thereof. The guide member 50 is between the wall-side insertion holes 44.

The guide member 50 faces the wall-side insertion holes 44. Furthermore, the guide member 50 is opposite the mounting base-side insertion opening 33 through the insertion hole 34 with respect to an insertion direction Y1 of the clip 80. The guide member 50 guides the clip 80 in the insertion direction Y1 to the mounting base-side insertion opening 33 when the clip 80 is inserted in the mounting hole 38. Namely, the guide member 50 is positioned just in front of the mounting base-side insertion opening 33 via the insertion hole 34 and as illustrated in FIG. 3, the mounting hole 38, the mounting base-side insertion opening 33, and the guide member 50 are arranged on a same line in a plan view.

Figure 2:
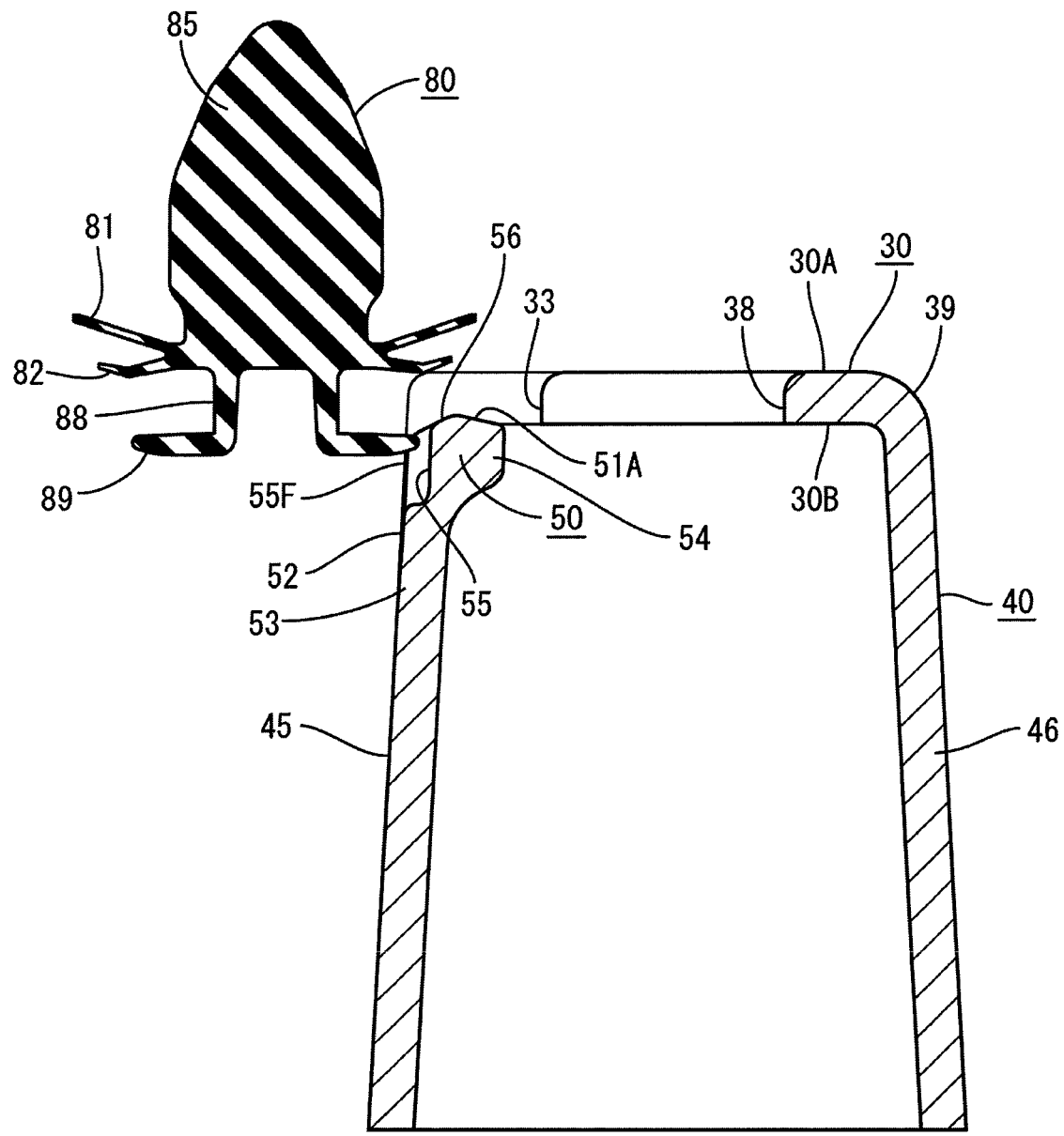
FIG. 2 is a cross-sectional view of the clip mounting seat and a clip before the clip is mounted in the clip mounting seat while a leg portion of the clip being in contact with a recess edge of a guide recess portion (a cut position is along line X-X in FIG. 1).

The guide member 50 is a part of the insertion-side wall 45 and extends upward along the extending direction of the insertion-side wall 45 and extends substantially perpendicular to the mounting base 30. As illustrated in FIGS. 1 and 2, the guide member 50 includes a base portion 53 that is continuous from the insertion-side wall 45 and an end portion 54 that is continuous form the base portion 53. The end portion 54 is thicker than the base portion 53. The guide member 50 has a guide recess portion 55 on an outer surface 52 of the end portion 54 and the guide recess portion 55 is recessed toward the mounting base-side insertion opening 33. The end portion 54 has an inclined surface 56 on a mounting base 30 side portion of an upper surface 51A thereof at a connection part between the upper surface 51A and the guide recess portion 55. As illustrated in FIG. 2, the inclined surface 56 is inclined upward from the upper edge of the outer surface 52 of the insertion-side wall 45 toward the mounting base-side insertion opening 33 and the upper surface 51A is formed in a projected surface with the inclined surface 56.

Figure 3:
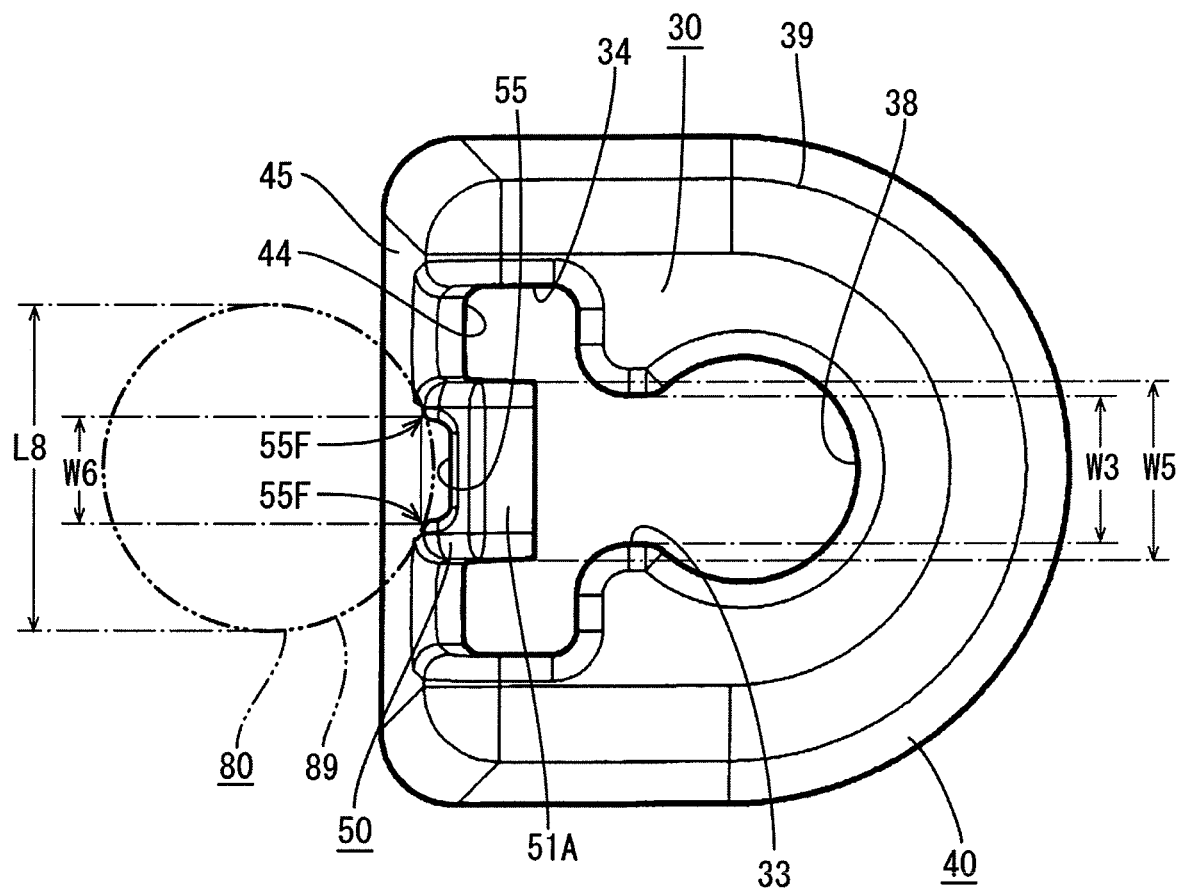
FIG. 3 is a plan view of the clip mounting seat and the clip of FIG. 2 seen from an upper side of the clip mounting seat (only the leg portion of the clip is schematically illustrated).

As illustrated in FIG. 3, the guide member 50 has a width W5 that is greater than an opening width W3 of the mounting base-side insertion opening 33. According to such a configuration, the clip 80 can be guided stably in the insertion direction and the clip 80 is less likely to drop off from the guide member 50. The guide member 50 extends substantially vertically to the mounting base 30. According to such a configuration, a plan view area of the guide member 50 can be reduced compared to a clip mounting base including a guide member having a surface that is inclined upward from an upper end of the insertion-side wall to the mounting hole. Accordingly, the plan view area of the clip mounting seat 10 as a whole can be reduced, and the clip mounting seat 10 according to this embodiment can be effectively used in a configuration having a small mounting area.

As illustrated in FIG. 2, when the clip 80 is mounted in the clip mounting seat 10, the clip 80 is contacted with the outer surface 52 of the end portion 54 of the guide member 50. Specifically, a leg portion 89 of the clip 80 is contacted with the guide recess portion 55 of the end portion 54 and the clip 80 is positioned on the guide member 50 with the contacted portions. Then, the clip 80 that is positioned at the guide recess portion 55 is guided toward the mounting base-side insertion opening 33. As illustrated in FIG. 2, the guide member 50 has a height dimension (a length dimension) such that the upper surface 51A is at a substantially same level as a lower surface 30B of the mounting base 30. Namely, the length dimension of the guide member 50 is such that the upper surface 51A of the guide member 50 is at a lower level than an upper surface 30A of the mounting base 30.

As illustrated in FIG. 2, the clip 80 includes a head portion 85, a shaft portion 88, and the leg portion 89. The clip 80 further includes a first flange member 81 and a second flange member 82 that are away from the leg portion 89 with predetermined distances, respectively. The first flange member 81, the second flange member 82, and the leg portion 89 extend outwardly from the shaft portion 88 and have a plan-view circular shape (the leg portion 89 is illustrated in FIG. 3). As illustrated in FIG. 3, the leg portion 89 has a diameter L8 in a plan view that is greater than a width W6 of the guide recess portion 55.

Next, a method of mounting the clip 80 will be described. When the clip 80 is mounted in the clip mounting seat 10, as illustrated in FIG. 2, the leg portion 89 of the clip 80 is contacted with the guide recess portion 55 of the guide member 50. As illustrated in FIG. 3, the width W6 of the guide recess portion 55 is smaller than the plan-view diameter L8 of the leg portion 89. Therefore, the leg portion 89 having a plan view circular shape is contacted with recess edges 55F, 55F of the guide recess portion 55, namely, the leg portion 89 is contacted with the guide recess portion 55 at the two points. Thus, the contacted portions of the clip 80 are positioned on the guide member 50 with the guide recess portion 55 and the clip 80 is guided toward the mounting base-side insertion opening 33.

Figure 4:
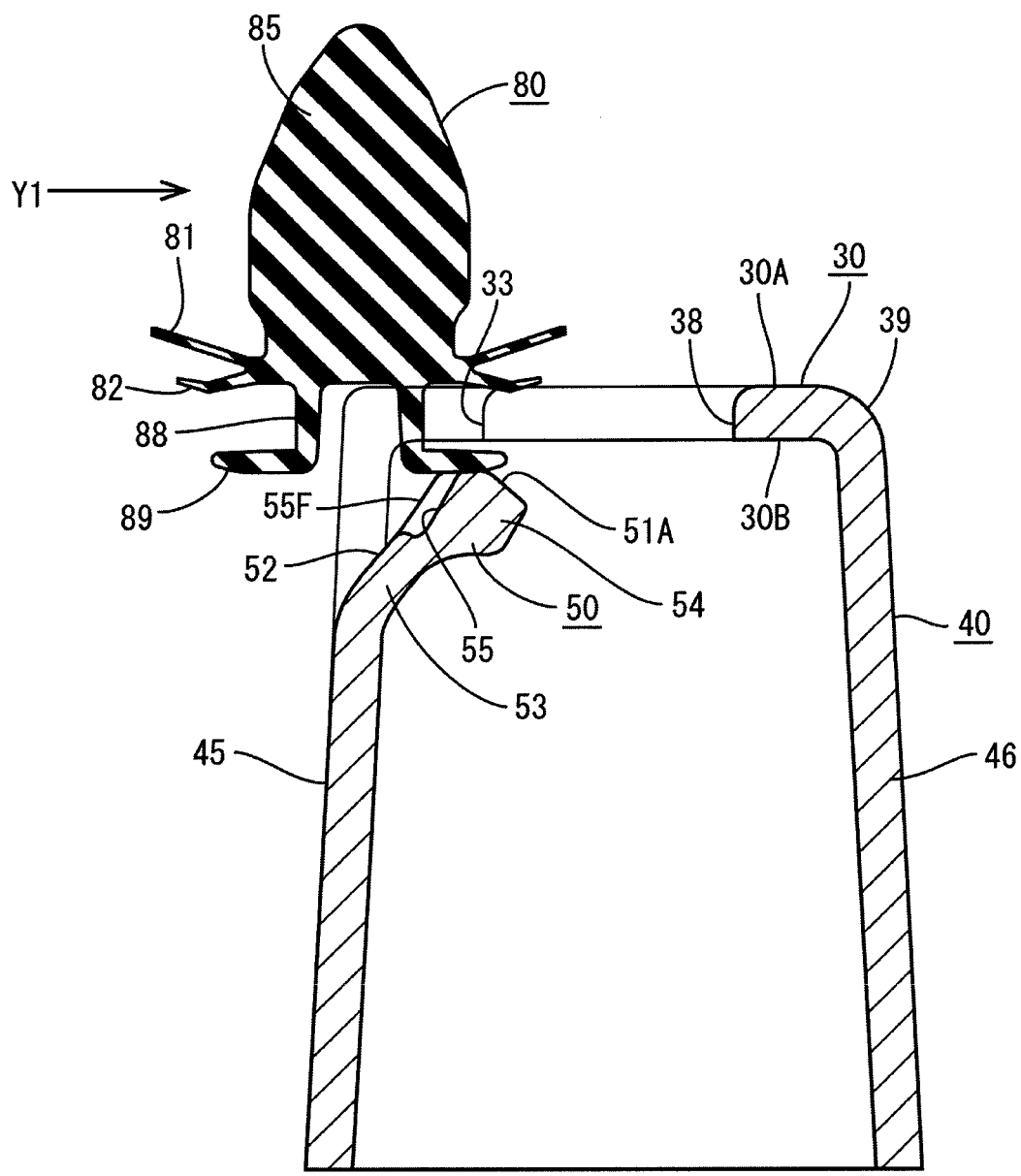
FIG. 4 is a cross-sectional view illustrating the clip mounting seat and the clip that is to be mounted in the clip mounting seat while a guide member being elastically deformed by the clip (a cut position is along line X-X in FIG. 1).
Figure 5:
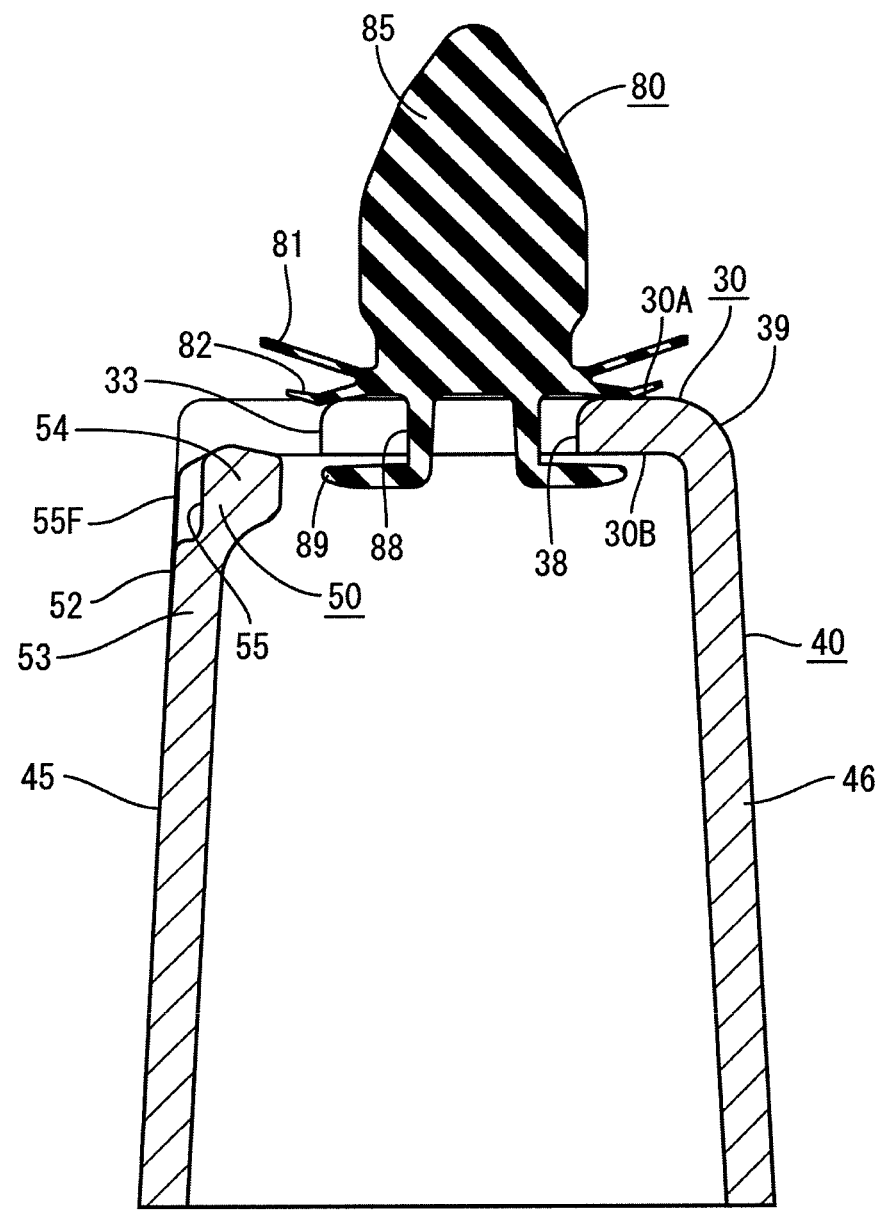
FIG. 5 is a cross-sectional view illustrating the clip mounting seat and the clip that is mounted in a mounting hole (a cut position is along line X-X in FIG. 1).

The clip 80 is contacted with the guide recess portion 55 at the two points so as to be positioned just in front of the mounting base-side insertion opening 33 and the positioned clip 80 is moved further in the Y1 direction and the horizontal direction. Then, as illustrated in FIG. 4, the leg portion 89 of the clip 80 presses the guide member 50 downwardly and the guide member 50 is elastically deformed. Then, the lower surface of the leg portion 89 is contacted with the inclined surface 56. If the clip 80 is further moved in the Y1 direction, the clip 80 moves over the guide member 50 and is inserted straight into the mounting hole 38 through the wall-side insertion holes 44, the insertion hole 34, and the mounting base-side insertion opening 33. Accordingly, the clip 80 is mounted in the mounting hole 38 as illustrated in FIG. 5. When the clip 80 is mounted in the mounting hole 38, the shaft portion 88 is inserted in the mounting hole 38 and the second flange member 82 and the leg portion 89 sandwich the mounting base 30 such that the clip 80 is fixed to mounting base 30.

As described before, the guide member 50 is just in front of the mounting base-side insertion opening 33, and the mounting hole 38, the mounting base-side insertion opening 33, and the guide member 50 are arranged on a same line in the plan view. According to such a configuration, the clip 80 is less likely to be inserted obliquely with respect to the insertion hole 34, the mounting base-side insertion opening 33, or the mounting hole 38. Even if the clip 80 is contacted with the guide member 50 obliquely and moved in the Y1 direction and the horizontal direction, the position of the clip 80 is corrected with the guide recess portion 55 and the leg portion 89 of the clip 80 is contacted with the two points of the recess edges 55F, 55F. Thus, in mounting of the clip 80, the clip 80 is always arranged in a correct posture with respect to the mounting base-side insertion opening 33 and inserted in the mounting hole 38.

Figure 6:
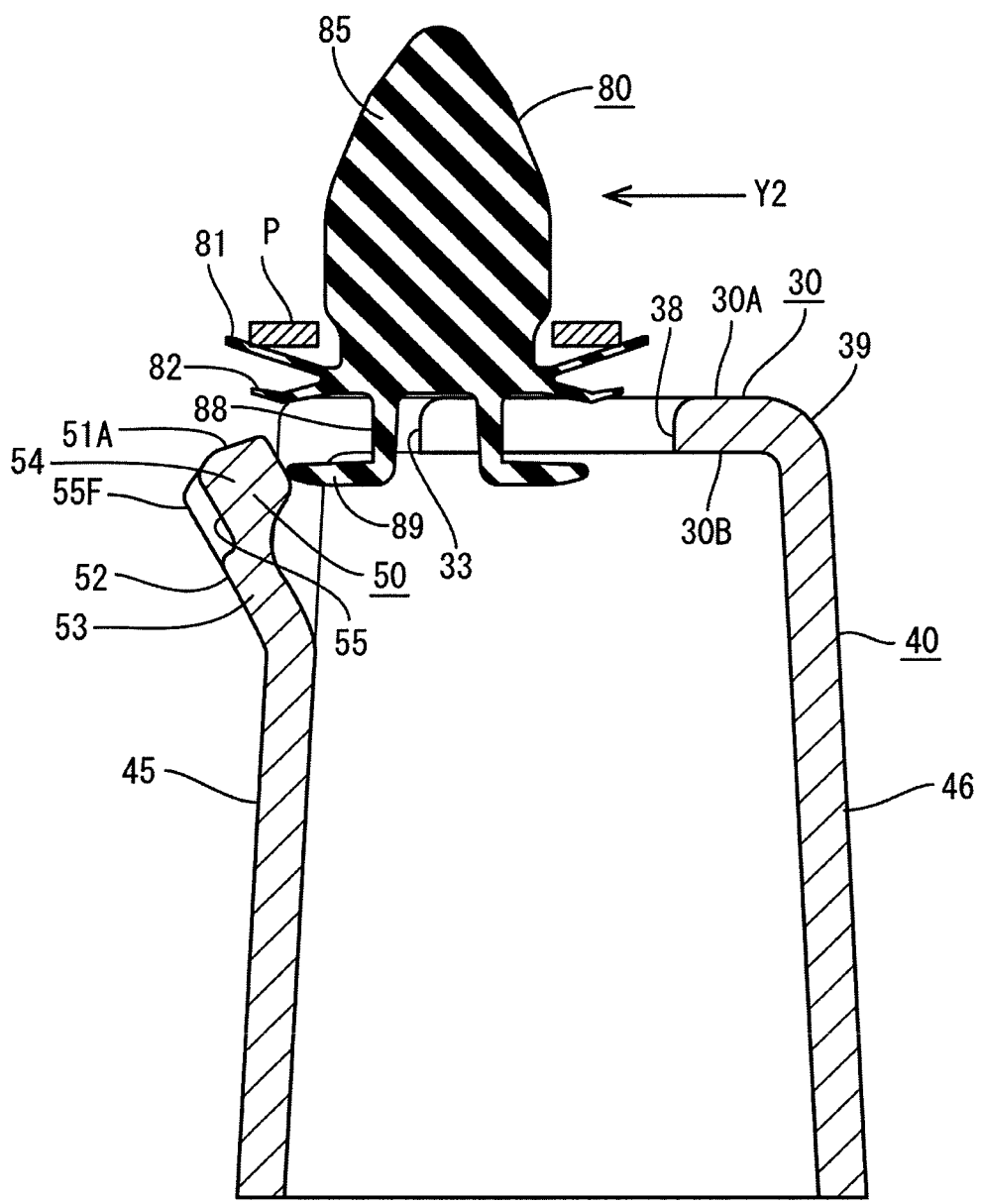
FIG. 6 is a cross-sectional view illustrating the clip mounting seat and the clip that is prevented from being detached from the clip mounting seat by the guide member.

As described before, the upper surface 51A of the guide member 50 is substantially at a same level as the lower surface 30B of the mounting base 30 as illustrated in FIG. 2. Therefore, as illustrated in FIG. 5, when the clip 80 is mounted in the mounting hole 38, the leg portion 89 arranged at a lower level than (below) the lower surface 30B of the mounting base 30 overlaps and is opposite the guide member 50 in the horizontal direction. According to such a configuration, as illustrated in FIG. 6, if a force in the Y2 direction is applied to the clip 80 that is mounted in the clip mounting seat 10 and the clip 80 is moved from the mounting hole 38 of the mounting base 30 through the mounting base-side insertion opening 33 and almost moved out of the mounting hole 38, the leg portion 89 hits the guide member 50. The clip 80 pushes the guide member 50 with the leg portion 89 and the guide member 50 is elastically deformed outward as described in FIG. 6. However, the guide member 50 restores its original shape with the elastic force and the clip 80 is moved back to the mounting hole 38 and is not moved out of the mounting hole 38.

Accordingly, the guide member 50 extending straight along the extending direction of the insertion-side wall 45 functions as a stopper for stopping the clip 80 from moving out of the mounting hole 38. Therefore, the clip 80 is less likely to be detached from the mounting base 30. Especially, the width W5 of the guide member 50 is greater than the opening width W3 of the mounting base-side insertion opening 33. With such a configuration, the function of the stopper can be exerted surely and effectively.

OPERATIONS AND ADVANTAGEOUS EFFECTS

According to the clip mounting seat 10 of this embodiment, the clip 80 is inserted in the mounting hole 38 of the mounting base 30 through the wall-side insertion holes 44, the insertion hole 34, and the mounting base-side insertion opening 33. The insertion-side wall 45 includes the guide member 50 that is adjacent to the wall-side insertion holes 44 and opposite the mounting base-side insertion opening 33 with respect to the insertion direction Y1 of the clip 80. According to such a configuration, the clip 80 can be guided in a predetermined direction and insertion errors of the clip 80 are less likely to be caused.

The guide member 50 extends in the extending direction of the insertion-side wall 45 and the width W5 of the guide member 50 is greater than the opening width W3 of the mounting base-side insertion opening 33 through which the clip 80 is inserted. Therefore, the clip 80 that is once inserted in the mounting hole 38 is less likely to be detached from the mounting base 30. Especially, the guide member 50 extends in the extending direction of the insertion-side wall 45 and therefore, the clip 80 that is to be detached from the mounting base 30 in a direction perpendicular to the extending direction of the guide member 50 is pushed back by the guide member 50. Thus, the guide member 50 prevents the clip from being detached from the mounting base.

If the width W5 of the guide member 50 is increased, the clip 80 may not be contacted with the guide member 50 stably and the first contact position of the clip 80 that is first contacted with the guide member 50 when the clip 80 is inserted is varied. However, the guide member 50 has the guide recess portion 55 recessed toward the mounting base-side insertion opening 33 on the outer surface 52 of the end portion 54 of the guide member 50 according to this embodiment. With such a configuration, the clip 80 can be inserted in the insertion hole 34 at a predetermined angle with respect to the mounting base-side insertion opening 33 and the clip 80 can be mounted in the mounting hole 38 with a correct posture. Thus, the clip 80 can be mounted in the mounting hole 38 with a correct posture while restricting occurrence of insertion errors of the clip 80 and therefore, the clip 80 that is mounted in the mounting hole 38 once is less likely to be detached from the mounting base 30.

The width W6 of the guide recess portion 55 is smaller than the diameter L8 of the circular plan-view shaped leg portion 89 of the clip 80. Therefore, when a curved edge of the leg portion 89 of the clip 80 is contacted with the guide recess portion 55, the clip 80 is contacted with the guide recess portion 55 at two points of the recess edges 55F, 55F. Therefore, the contact position of the leg portion 89 of the clip 80 is stable and the posture of the clip 80 that is to be inserted is likely to be stable. Thus, the insertion errors of the clip 80 are less likely to be caused.

The guide member 50 extends substantially vertically to the mounting base 30 and the guide recess portion 55 for positioning and guiding the guide member 50 is included on the outer surface 52 of the guide member 50. Therefore, the dimension of the guide member 50 in the insertion direction of the clip 80 can be small and accordingly, the plan view area of the guide member 50 can be small and the plan view area of the clip mounting seat 10 can be small. According to such a configuration, the clip mounting seat 10 can be effectively and preferably used even in a configuration having a restricted mounting area.

The invention claimed is:

1. A clip mounting seat in which a clip is mounted, the clip mounting seat comprising:
    a mounting base having an outer edge, a mounting hole in which the clip is mounted, and a mounting base-side insertion opening that is included at a part of a hole edge of the mounting hole and through which the clip is inserted to the mounting hole;
    a wall extending downward from the outer edge of the mounting base and including an insertion-side wall having a wall-side insertion hole that is communicated with the mounting base-side insertion opening; and
    a guide member included in the insertion-side wall and extending along an extending direction of the insertion-side wall, the guide member being adjacent to the wall-side insertion hole and opposite the mounting base-side insertion opening with respect to an insertion direction in which the clip is inserted, the guide member having a width that is greater than an opening width of the mounting base-side insertion opening and being configured to guide the clip in the insertion direction, wherein
    the guide member includes a guide recess portion on an outer surface of an end portion thereof, the guide recess portion guiding a contact portion of the clip that is contacted with the guide member, and
    the guide recess portion is recessed toward the mounting base-side insertion opening.

2. The clip mounting seat according to claim 1, wherein the guide recess portion has a width smaller than a diameter of a plan view circular shaped leg portion of a clip that is to be mounted in the mounting hole.

3. The clip mounting seat according to claim 1, wherein the guide member includes a base portion that is continuous from the insertion-side wall and an end portion that is continuous from the base portion, and
    the end portion has a width that is greater than the opening width of the mounting base-side insertion opening.

4. The clip mounting seat according to claim 3, wherein the end portion has a thickness greater than that of the base portion.

5. The clip mounting seat according to claim 1, wherein the guide recess portion has recess edges extending in the extending direction of the insertion-side wall and the clip is to be contacted with the recess edges and guided to the mounting base-side insertion opening.

6. The clip mounting seat according to claim 1, wherein the end portion has an inclined surface on an upper surface thereof and the inclined surface is inclined upward from an upper edge of the outer surface toward the mounting base-side insertion opening.

7. The clip mounting seat according to claim 1, wherein a lower surface of the mounting base and an upper surface of the end portion of the guide member are at substantially a same level.

8. The clip mounting seat according to claim 7, wherein in the clip mounted in the mounting hole, a part of a leg portion of the clip that is at the mounting base-side insertion opening is opposite the guide member in the insertion direction of the clip and other part of the leg portion is below the mounting base.

9. The clip mounting seat according to claim 1, wherein the clip is guided along the guide recess portion to the mounting base-side insertion opening.

10. The clip mounting seat according to claim 1, wherein
the mounting base further includes an insertion hole that is communicated with the mounting hole through the mounting base-side insertion opening and communicated with the wall-side insertion hole, and
the clip is inserted from the insertion hole toward the mounting hole through the mounting base-side insertion opening.

11. A clip mounting seat in which a clip is mounted, the clip mounting seat comprising:
a mounting base having an outer edge, a mounting hole in which the clip is mounted, and a mounting base-side insertion opening that is included at a part of a hole edge of the mounting hole and through which the clip is inserted to the mounting hole;
a wall extending downward from the outer edge of the mounting base and including an insertion-side wall having a wall-side insertion hole that is communicated with the mounting base-side insertion opening; and
a guide member included in the insertion-side wall and extending along an extending direction of the insertion-side wall, the guide member being adjacent to the wall-side insertion hole and opposite the mounting base-side insertion opening with respect to an insertion direction in which the clip is inserted, the guide member having a width that is greater than an opening width of the mounting base-side insertion opening and being configured to guide the clip in the insertion direction, wherein
the guide member includes a base portion that is continuous from the insertion-side wall and an end portion that is continuous from the base portion,
the end portion has a width that is greater than the opening width of the mounting base-side insertion opening, and
the end portion has a thickness greater than that of the base portion.

* * * * *